Aug. 11, 1931.                J. W. COX                1,818,943
                           CONDUIT FITTING
                         Filed Feb. 13, 1925
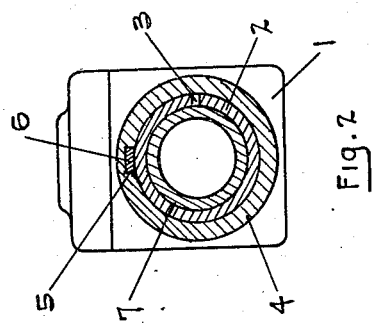
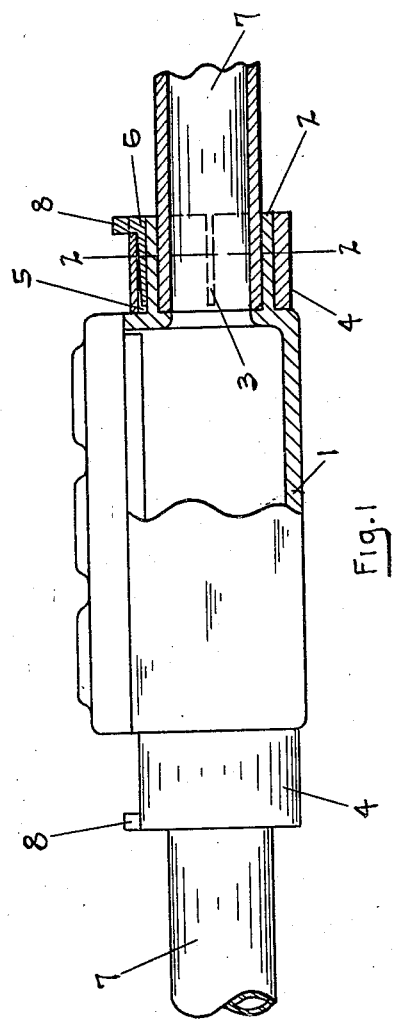
Inventor
John W. Cox
By
       Attorney Patented Aug. 11, 1931

1,818,943

UNITED STATES PATENT OFFICE

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed February 13, 1925. Serial No. 8,917.

This invention is designed to provide a conduit fitting which may be used in connection with a conduit, as a box, or for joining conduits together and it is particularly directed to a connection in which the end of the conduit is clamped rather than screw-threaded for holding it in the fitting. Features and details of the invention will appear from the specification and claims.

The invention is illustrated in the accompanying drawings as follows:—

Fig. 1 shows a side elevation, partly in section.

Fig. 2 a section on the line 2—2 in Fig. 1.

1 marks the body of the fitting which, as shown, is a conduit box. This has an annular extension 2 longitudinally slotted at 3.

A ring 4 is arranged around the extension. This ring is provided with a key-way 5 and a wedge 6 is driven into the key-way between the wall of the ring and the extension, the effect of which is to contract the extension on a conduit 7 so as to securely clamp the conduit on the fitting. A tang 8 is preferably provided on the wedge in order that it may be readily driven to place and also removed. This tang extends outwardly beyond the surface of the ring so as to give ample driving surface and to provide a means by which the wedge may be removed if it is desired to disconnect the conduit.

What I claim as new is:—

1. In a conduit fitting, the combination of a body; a slotted conduit receiving extension on the body; a ring surrounding the extension; and a wedge between the ring and extension adapted to contract the extension into engagement with a conduit by direct radial wedging action of the wedge upon the extension.

2. In a conduit fitting, the combination of a body; a slotted conduit receiving extension on the body; a ring surrounding the extension, there being a key-way between the extension and ring; and a wedge in the key-way acting on the extension to contract the same by direct radial wedging action of the wedge upon the extension.

3. In a conduit fitting, the combination of a body; a slotted conduit receiving extension on the body; a ring surrounding the extension, said ring having an axially extending key-way; and a wedge in the key-way contracting the extension by direct radial wedging action of the wedge on the extension.

4. In a conduit fitting, the combination of a body; a slotted conduit receiving extension on the body; a ring surrounding the extension; a wedge between the ring and extension adapted to contract the extension into engagement with a conduit by direct radial wedging action of the wedge upon the extension; and a tang on the wedge extending radially beyond the outer surface of the ring.

In testimony whereof I have hereunto set my hand.

JOHN WILLIAM COX.